US009079052B2

(12) United States Patent
Quan

(10) Patent No.: US 9,079,052 B2
(45) Date of Patent: Jul. 14, 2015

(54) HEAT CONCENTRATING TYPE SELF-OPERATED AUTOMATIC FIRE VALVE

(71) Applicant: Tianbaiii new technology development Co., Ltd, Beijing (CN)

(72) Inventor: Longhao Quan, Beijing (CN)

(73) Assignee: Tianbaiii new technology development Co. Ltd, Beijing (CN)

( * ) Notice: Subject to any disclaimer, the term of this patent is extended or adjusted under 35 U.S.C. 154(b) by 221 days.

(21) Appl. No.: 13/859,481

(22) Filed: Apr. 9, 2013

(65) Prior Publication Data

US 2013/0312842 A1 Nov. 28, 2013

(30) Foreign Application Priority Data

May 25, 2012 (CN) .......................... 2012 1 0164539

(51) Int. Cl.
*F16K 17/38* (2006.01)
*A62C 37/08* (2006.01)
*A62C 37/11* (2006.01)

(52) U.S. Cl.
CPC ................ *A62C 37/08* (2013.01); *A62C 37/11* (2013.01)

(58) Field of Classification Search
CPC ...... F15B 21/045; F17C 13/026; F16K 31/08; A62C 37/08; A62C 37/11
USPC ................................ 137/468; 251/65, 129.01
See application file for complete search history.

(56) References Cited

U.S. PATENT DOCUMENTS 5,897,096 A * 4/1999 Nakano .......................... 251/65
2006/0124880 A1* 6/2006 King .............................. 251/65

* cited by examiner

*Primary Examiner* — Kevin Lee
*Assistant Examiner* — P. Macade Nichols

(57) ABSTRACT

A heat concentrating type self-operated automatic fire valve is characterized in that the first piston is provided on a top of the water inlet channel in the valve body, the piston cover is compressed on a circumferential periphery of the first piston; a pressurizing channel is provided on a center of the first piston; a first pressure relief channel is provided on a center or a circumferential periphery of the piston cover; the first pressure relief channel on the piston cover is communicated with the second pressure relief channel on the valve body; a magnetic pillar unit is sealedly provided on an upper portion of the valve core, and the second piston is provided on a lower portion of the valve core; a magnetic ring sleeve unit is sleeved on the valve-core sleeve, and a magnetic ring unit is provided in the magnetic ring sleeve unit.

16 Claims, 2 Drawing Sheets

HEAT CONCENTRATING TYPE SELF-OPERATED AUTOMATIC FIRE VALVE

BACKGROUND OF THE PRESENT INVENTION

1. Field of Invention

The present invention relates to a heat concentrating type self-operated automatic fire valve, which belongs to fields of fire protection and automatic control equipment for temperature reduction.

2. Description of Related Arts

In the conventional fire fighting systems, ionic smoke sensors and glass bulb type sprinkler heads are installed in the room. Due to high investment and lack of flexibility in installation thereof, the conventional fire fighting systems are only utilized in buildings such as high-level hotels, restaurants and office premises. The glass bulb type sprinkler head, which is a disposable device, automatically cracks to spray water. However, when the fire is put out, since the glass bulb type sprinkler head is not capable of switching off automatically, the water still sprays continuously, which not only wastes large quantity of precious water resource, but also causes water logging damages. For instance, secondary disasters due to serious water logging occur in libraries, reference rooms or laboratories for assembling instruments, which causes irretrievable damages. In the references, automatic water spraying without power is achieved by combination structures of magnetic coupling and temperature-memory alloy. However, because the linkage rod which drives the magnetic ring is limited by overall dimension of the piston sleeve, the memory alloy in the original design is required to have relatively large diameter size, which decreases the thrust force in deformation process, and thus the valve can not be opened sometimes. Furthermore, since the valve body is in a straight through type structure, the memory alloy and the valve cap can only be vertical to the valve body. Therefore, it is difficult to install the valve body of the valve above the suspended ceiling, i.e., for connecting with a water pipe. Thus, the thermal sensing elements, such as the memory alloy are installed below the suspended ceiling.

SUMMARY OF THE PRESENT INVENTION

An object of the present invention is to provide a fire protection spraying device which is capable of automatically detecting abnormal variations of indoor temperatures, and automatically opening and closing. No external power is required while a system of the fire protection spraying device is working.

Technical solution of the present invention is achieved as follows. A heat concentrating type self-operated automatic fire valve according to a preferred embodiment of the present invention mainly comprises a valve body, a first piston, pressure relief channels, a piston cover, a valve core, a lower magnetic ring, a reset spring, a valve cap, a heat concentrating shield, a baffle, a fastener, a memory alloy, a thermal insulation pad, a linkage rod, an upper magnetic ring sleeve, a valve-core sleeve, a valve cover, a second piston which is smaller than the first piston, multiple water outlet channel, a water inlet channel and a pressurizing channel, wherein:

the first piston is provided on a top of the water inlet channel in the valve body, and cooperated with the water inlet channel for controlling quantity of medium flow which passes through the heat concentrating type self-operated automatic fire valve, the piston cover is compressed on a circumferential periphery of the first piston;

the pressurizing channel is provided on a center of the first piston;

the first pressure relief channel is provided on a center or a circumferential periphery of the piston cover, and the first pressure relief channel is cooperated with the second piston providing on a lower end portion of the valve core, so as to control opening and closing of the heat concentrating type self-operated automatic fire valve;

the first pressure relief channel on the piston cover is communicated with the second pressure relief channel of the valve body, and a cross sectional area of the first pressure relief hole of the piston cover to thereof the water inlet of the valve body is over 1:80; and a magnetic pillar unit is sealedly provided on an upper portion of the valve core, the second piston is provided on a lower portion of the valve core, the upper portion of the valve core is inserted in the valve-core sleeve;

a magnetic ring sleeve unit is sleeved on the valve-core sleeve, and a magnetic ring unit is provided in the magnetic ring sleeve unit;

the magnetic ring sleeve unit comprises an upper magnetic ring sleeve and a lower magnetic ring sleeve which are connected with each other by a screw thread;

an upper portion of the upper magnetic ring sleeve is in a shape of a polygon, and is inserted into a groove which is provided on an upper portion of the valve cap and has a same shape therewith;

the reset spring is sleeved on an outer cylindrical periphery of a middle portion or the upper portion of the upper magnetic ring sleeve, a top portion of the reset spring is supported on a top portion of an inner cavity of the valve cap;

the upper portion of the upper magnetic ring sleeve is connected to and cooperated with the linkage rod by a screw thread;

the linkage rod passes through the valve cap, the heat concentrating shield, the thermal insulation pad, the memory alloy and the baffle, and is connected with the fastener by a screw thread;

the thermal insulation pad isolates the memory alloy from the valve cap which is made of metal;

the heat concentrating shield is connected with a top portion of the valve cap by a screw thread or a fastener;

the valve body has one water inlet channel and one to four water outlet channels; and the water inlet channel is for connecting with a main hydrant pipeline, and the one to four water outlet channels are for connecting with one to four spray headers.

When surrounding temperature of the memory alloy is over an operating temperature of the memory alloy, the memory alloy which is in a shape of a spiral deforms to push the heat concentrating type self-operated automatic valve open.

In addition, the heat concentrating type self-operated automatic valve can also be manually opened by rotating the linkage rod clockwisely, then the linkage rod drives the magnetic ring sleeve to move. Since the upper portion of the magnetic ring sleeve is inserted in the groove provided in the valve cap which has the same shape therewith, the magnetic ring sleeve can not rotate and is only capable of moving upward. The upper magnetic ring sleeve rises and drives the valve core to move upwardly by an effect of magnetic coupling, and thus the heat concentrating type self-operated automatic fire valve is opened.

Beneficial effects of the heat concentrating type self-operated automatic fire valve according to the preferred embodiment of the present invention are as follows. Since the heat concentrating type self-operated automatic fire valve has a function of automatically opening and closing, the drawbacks exist in the conventional technology that, water is still spraying continuously when the fire is put out is avoided. Thus, not only the water source is saved, but a secondary disaster caused by plenty of water spray is avoided. As a result, it is possible for a fire protection technique from China to replace the conventional glass bulb type fire protection techniques in other countries. In addition, the heat concentrating type self-operated automatic fire valve also has a function of being turned on manually.

These and other objectives, features, and advantages of the present invention will become apparent from the following detailed description, the accompanying drawings, and the appended claims.

Figure 1:
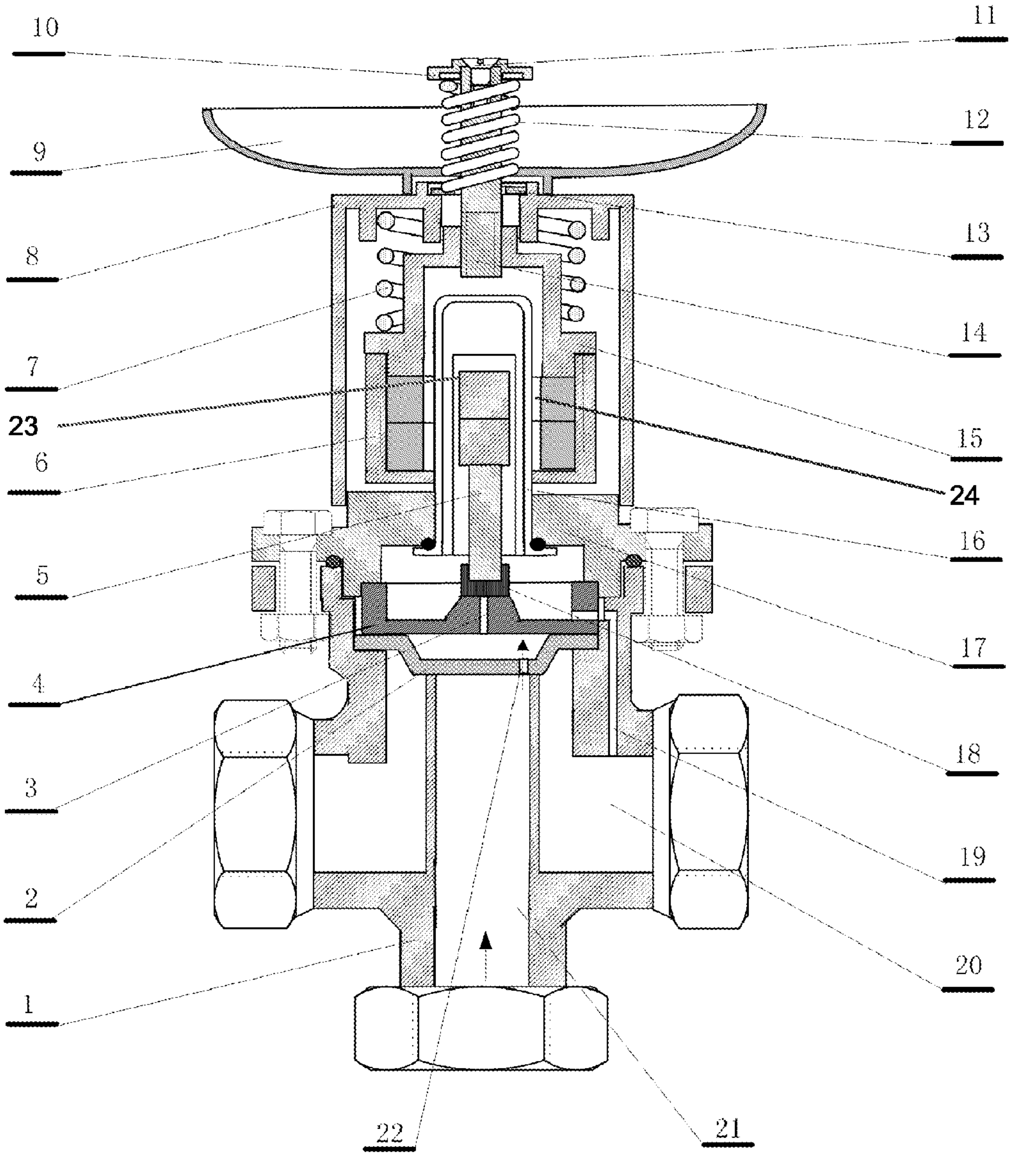
FIG. 1 is a schematic structural diagram of a heat concentrating type self-operated automatic fire valve according to a preferred embodiment of the present invention, showing the valve is in a closed state.

Reference numbers of elements in the drawings is as follows: 1—valve body, 2—first piston, 3—first pressure relief channel, 4—piston cover, 5—valve core, 6—lower magnetic-ring sleeve, 7—reset spring, 8—valve cap, 9—heat concentrating shield, 10—baffle, 11—fastener, 12—memory alloy, 13—thermal insulation pad, 14—linkage rod, 15—upper magnetic ring sleeve, 16—valve-core sleeve, 17—valve cover, 18—second piston, 19—second pressure relief channel, 20—water outlet channels, 21—water inlet channel, 22—pressurizing channel, 23—magnetic pillar unit; and wherein water flow directions is shown by directions of arrows in the drawings.

DETAILED DESCRIPTION OF THE PREFERRED EMBODIMENT

A heat concentrating type self-operated automatic fire valve according to a preferred embodiment of the present invention mainly comprises a valve body 1, a first piston 2, a first pressure relief channel 3, a piston cover 4, a valve core 5, a lower magnetic ring 6, a reset spring 7, a valve cap 8, a heat concentrating shield 9, a baffle 10, a fastener 11, a memory alloy 12, a thermal insulation pad 13, a linkage rod 14, an upper magnetic ring sleeve 15, a valve-core sleeve 16, a valve cover 17, a second piston 18 which is smaller than the first piston 2, a second pressure relief channel 19, a water outlet channel 20, a water inlet channel 21 and a pressurizing channel 22, wherein:

the first piston 2 is provided on a top of the water inlet channel 21 in the valve body 1, and cooperated with the water inlet channel 21 for controlling quantity of medium flow which passes through the heat concentrating type self-operated automatic fire valve, the piston cover 4 is compressed on a circumferential periphery of the first piston 2;

the pressurizing channel 22 is provided on the first piston 2, and preferably on a center thereof;

the first piston 2 is made of materials having good flexibility, such as rubber or silica gel;

the first pressure relief channel 3 is provided on a center or a circumferential periphery of the piston cover 4, and the first pressure relief channel is cooperated with the second piston 18 providing on a lower end portion of the valve core 5, so as to control opening and closing of the heat concentrating type self-operated automatic fire valve;

a cross sectional area of the first pressure relief hole 3 of the piston cover 4 to thereof the water inlet 21 of the valve body 1 is over 1:80, and the first pressure relief channel 3 is communicated with the second pressure relief channel 19 of the valve body 1;

a magnetic pillar unit 23 is sealedly provided on an upper portion of the valve core 5, the upper portion of the valve core 5 is inserted in the valve-core sleeve 16, and the valve-core sleeve 16 is fixedly mounted on a lower portion of the valve cover 17 by welding;

the valve cover 17 is connected with the valve body 1 by a screw thread or a fastener;

a magnetic ring sleeve unit is sleeved on the valve-core sleeve 16, and a magnetic ring unit 24 is provided in the magnetic ring sleeve unit;

the magnetic ring sleeve unit comprises the upper magnetic ring sleeve 15 and the lower magnetic ring sleeve 6 which are connected with each other by a screw thread;

an upper portion of the upper magnetic ring sleeve 15 is in a shape of a polygon, such as a hexagon, and is inserted into a groove which is provided on an upper portion of the valve cap 8 and has a same shape therewith;

the reset spring 7 is sleeved on an outer cylindrical periphery of a middle portion or the upper portion of the upper magnetic ring sleeve 15, a top portion of the reset spring 7 is supported on a top portion of an inner cavity of the valve cap 8;

the upper portion of the upper magnetic ring sleeve 15 is connected to and cooperated with the linkage rod 14 by a screw thread;

the linkage rod 14 passes through the valve cap 8, the heat concentrating shield 9, the thermal insulation pad 13, the memory alloy 12, the baffle 10, and is connected with the fastener 11 by a screw thread;

the thermal insulation pad 13 isolates the memory alloy 12 from the valve cap 8 which is made of metal;

the heat concentrating shield 9 is connected with a top portion of the valve cap 8 by a screw thread or a fastener;

the valve body 1 has one water inlet channel 21 and one to four water outlet channels 20; and the water inlet channel 21 is for connecting with a main hydrant pipeline, and the one to four water outlet channels 20 are for connecting with one to four spray headers.

Working principle of the heat concentrating type self-operated automatic fire valve according to the preferred embodiment of the present invention is as follows. The heat concentrating type self-operated automatic fire valve is installed in a suspended ceiling of a storey, wherein:

the baffle 10, the fastener 11, the memory alloy 12, the heat concentrating shield 9 and the spray header are installed below the suspended ceiling and exposed in the room;

the water inlet channel 21 in the suspended ceiling is communicated with the main hydrant pipeline by a pipeline, the water outlet channels 20 are communicated with the spray headers below the suspended ceiling; and after installed, a shape of an exposed portion of the heat concentrating type self-operated automatic fire valve is similar to a shape of a glass-bulb fire fighting device in the conventional art.

Referring to FIG. 1 of the drawings, when indoor temperature is not elevated abnormally, i.e., no fire occurs, the memory alloy 12 is in a contraction state, and an elastic force of the reset spring 7 drives the upper magnetic ring sleeve 15 and the lower magnetic ring sleeve 24 to move towards a lower end of the valve-core sleeve 16. Due to magnetic coupling interaction, the upper magnetic ring sleeve 15 and the lower magnetic ring sleeve 24 drives the magnetic pillar unit 23 to move downwards, so as to force the second piston 18 on the lower end portion of the valve core 5 to plug the first pressure relief channel 3 on the piston cover 4. Water coming from the water inlet channel 21 of the valve body 1 flows through the pressurizing channel 22 on the piston 2 and accesses a top surface of the piston 2. Under the water pressure, the piston 2 tightly plugs a top end of the water inlet channel 21 in the valve body 1. Thus, the heat concentrating type self-operated automatic fire valve is closed and no water for fire fighting sprays from the pipeline and the sprinkler head.

Figure 2:
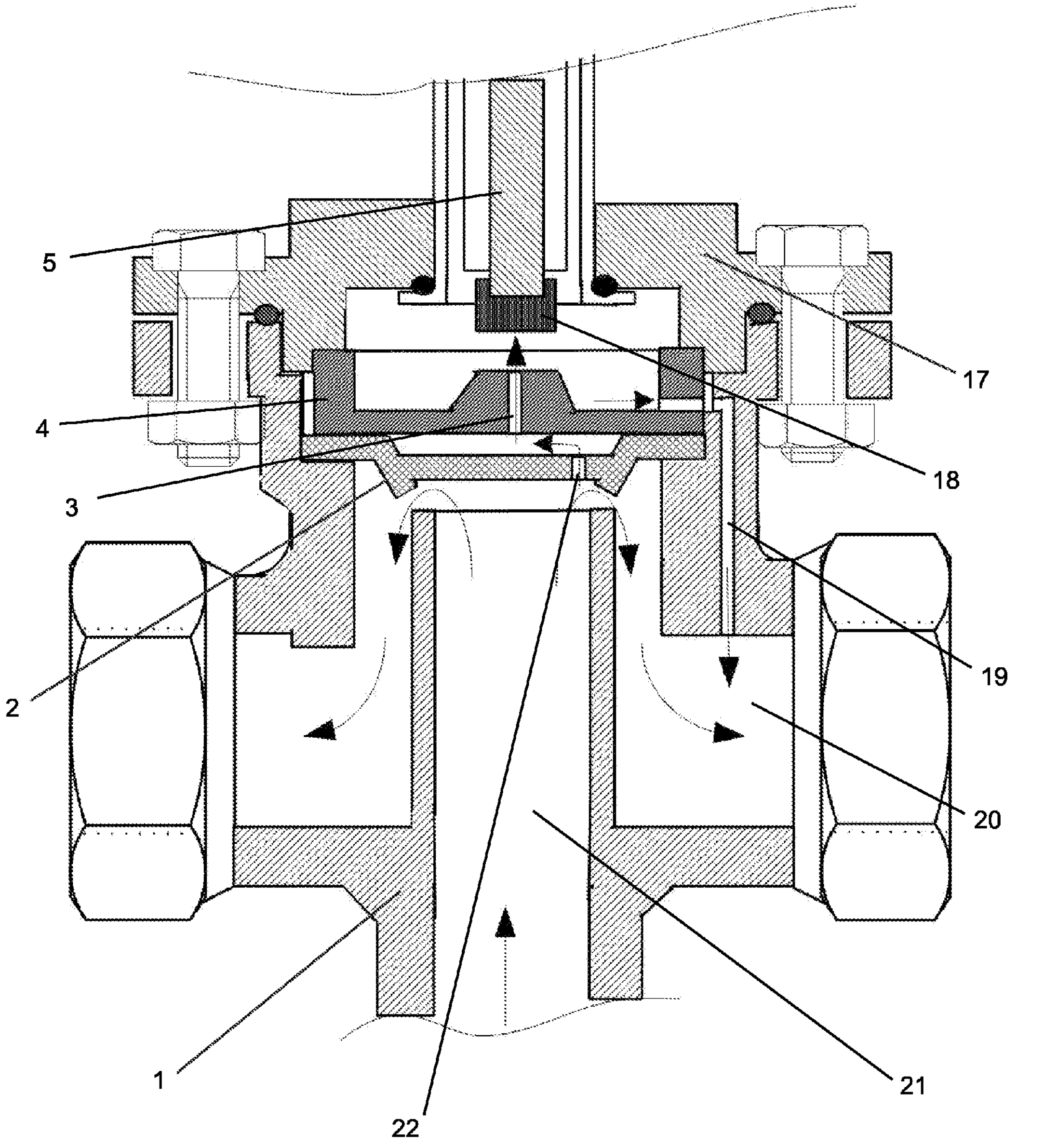
FIG. 2 is a partial sketch view of the heat concentrating type self-operated automatic fire valve according to the preferred embodiment of the present invention, showing the valve is opened.

Referring to FIG. 2 of the drawings, when fire occurs indoors and temperature thereof is abnormally elevated, under an effect of heat reflection by the heat concentrating shield 9, temperature of surroundings of the memory alloy 12 is rapidly elevated, so temperature of the memory alloy 12 is elevated accordingly. When the temperature of the memory alloy 12 reaches a deformation temperature value thereof, the memory alloy 12 in a shape of a spring is expanded, so as to drive the baffle 10 to move upwardly, which drives the linkage rod 14 to move upwardly too. The linkage rod 14 drives the upper magnetic ring sleeve 15 and the lower magnetic-ring sleeve 6 to move upwardly. By an effect of the magnetic coupling, the magnetic ring unit 24 in the magnetic ring sleeve drives the magnetic pillar unit 23 in the valve core 5 to move upwardly, and forces the second piston 18 to separate from the first pressure relief channel 3 on the piston cover 4. Water pressure on the top surface of the second piston 2 relieves pressure by the first pressure relief channel 3, the second pressure relief channel 19 and the water outlet channels 20. And water pressure on the water inlet channel 21 pushes the second piston 2 to separate from the top of water inlet channel 21. A main water flows into the water outlet channels 20, and passes through the pipelines and sprays out by the sprinkler heads. When the fire is put out, the temperature of the indoors gradually drops to a compressed value of the memory alloy 12. Then the temperature-memory alloy in the shape of the spring rapidly compresses to an original memory state. Under the interaction of the reset spring 7, the magnetic ring sleeve rapidly moves downward. The second piston 18 plugs the first pressure relief channel 3 on the piston cover 4, which causes that a pressure is generated rapidly on the top surface of the second piston 2. Accordingly, the second piston 2 rapidly plugs the water inlet channel 21, in such a manner that the heat concentrating type self-operated automatic fire valve is closed, and spraying is stopped.

Since the heat concentrating type self-operated automatic fire valve according to the preferred embodiment of the present invention has a function of automatically turning on and off, the drawbacks that in the conventional technology, when the glass bulb is cracked, though the fire is put out, water is still spraying continuously is avoided. Thus, not only the water source is saved, but a secondary disaster caused by plenty of water spray is avoided. As a result, it is possible that a fire protection technique in China replaces the conventional glass bulb type fire protection technique in other countries. In addition, the heat concentrating type self-operated automatic fire valve also has a function of being turned on manually. For example, when the heat concentrating type self-operated automatic fire valve is closed, by manually and clockwisely rotating the linkage rod 14 with a tool, the linkage rod 14 drives the upper magnetic ring sleeve 15 to move. Since the upper portion of the upper magnetic ring sleeve 15 is inserted in the groove provided in the upper portion of the valve cap 8 which has the same shape therewith, the upper magnetic ring sleeve 15 can not rotate and is only capable of moving upward. The upper magnetic ring sleeve 15 rises and drives the valve core 5 to move upwardly, and thus the heat concentrating type self-operated automatic fire valve is opened.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A heat concentrating self-operated automatic fire valve, comprising:

a valve body, a first piston, a first pressure relief channel, a piston cover, a valve core, a lower magnetic ring, a reset spring, a valve cap, a heat concentrating shield, a baffle, a fastener, a memory alloy, a thermal insulation pad, a linkage rod, an upper magnetic ring sleeve, a valve-core sleeve, a valve cover, a second piston which is smaller than said first piston, a second pressure relief channel, multiple water outlet channels, a water inlet channel and a pressurizing channel, wherein:

said first piston is provided on a top of said water inlet channel in said valve body, said piston cover is compressed on a circumferential periphery of said first piston;

said pressurizing channel is provided on a center of said first piston;

said first pressure relief channel is provided on a center or a circumferential periphery of said piston cover, said first pressure relief channel on said piston cover is communicated with said second pressure relief channel of said valve body;

a magnetic pillar unit is sealedly provided on an upper portion of said valve core, said second piston is provided on a lower portion of said valve core, and an upper portion of said valve core is inserted in said valve-core sleeve;

a magnetic ring sleeve unit is sleeved on said valve-core sleeve, and a magnetic ring unit is provided in said magnetic ring sleeve unit;

an upper portion of said magnetic ring sleeve unit is connected to and cooperated with said linkage rod by an inner screw thread; and said linkage rod passes through said valve cap, said heat concentrating shield, said thermal insulation pad, said memory alloy and said baffle, and is connected with said fastener by a screw thread.

2. The heat concentrating self-operated automatic fire valve, as recited in claim 1, wherein:

an upper portion of said upper magnetic ring sleeve is inserted into a groove which is provided on an upper portion of said valve cap and has a same shape therewith; and said reset spring is sleeved on an outer cylindrical periphery of a middle portion or said upper portion of said upper magnetic ring sleeve, a top portion of said reset spring is supported on a top portion of an inner cavity of said valve cap.

3. The heat concentrating self-operated automatic fire valve, as recited in claim 1, wherein said heat concentrating shield is connected with a top portion of said valve cap by a screw thread or a fastener.

4. The heat concentrating self-operated automatic fire valve, as recited in claim 2, wherein said heat concentrating shield is connected with a top portion of said valve cap by a screw thread or a fastener.

5. The heat concentrating self-operated automatic fire valve, as recited in claim 1, wherein said valve body comprises said water inlet channel and said multiple water outlet channels.

6. The heat concentrating self-operated automatic fire valve, as recited in claim 2, wherein said valve body comprises said water inlet channel and said multiple water outlet channels.

7. The heat concentrating self-operated automatic fire valve, as recited in claim 3, wherein said valve body comprises said water inlet channel and said multiple water outlet channels.

8. The heat concentrating self-operated automatic fire valve, as recited in claim 4, wherein said valve body comprises said water inlet channel and said multiple water outlet channels.

9. The heat concentrating self-operated automatic fire valve, as recited in claim 1, wherein a cross sectional area of a first pressure relief hole of said piston cover to thereof said water inlet of said valve body is over 1:80.

10. The heat concentrating self-operated automatic fire valve, as recited in claim 2, wherein a cross sectional area of a first pressure relief hole of said piston cover to thereof said water inlet of said valve body is over 1:80.

11. The heat concentrating self-operated automatic fire valve, as recited in claim 3, wherein a cross sectional area of a first pressure relief hole of said piston cover to thereof said water inlet of said valve body is over 1:80.

12. The heat concentrating self-operated automatic fire valve, as recited in claim 4, wherein a cross sectional area of a first pressure relief hole of said piston cover to thereof said water inlet of said valve body is over 1:80.

13. The heat concentrating self-operated automatic fire valve, as recited in claim 5, wherein a cross sectional area of a first pressure relief hole of said piston cover to thereof said water inlet of said valve body is over 1:80.

14. The heat concentrating self-operated automatic fire valve, as recited in claim 6, wherein a cross sectional area of a first pressure relief hole of said piston cover to thereof said water inlet of said valve body is over 1:80.

15. The heat concentrating self-operated automatic fire valve, as recited in claim 7, wherein a cross sectional area of a first pressure relief hole of said piston cover to thereof said water inlet of said valve body is over 1:80.

16. The heat concentrating self-operated automatic fire valve, as recited in claim 8, wherein a cross sectional area of a first pressure relief hole of said piston cover to thereof said water inlet of said valve body is over 1:80.

* * * * *